(12) United States Patent
Tsai et al.

(10) Patent No.: US 11,523,073 B2
(45) Date of Patent: Dec. 6, 2022

(54) IMAGE SENSOR WITH NOISE CANCELLATION FEATURE AND ELECTRONIC DEVICE WITH SAME

(71) Applicant: HON HAI PRECISION INDUSTRY CO., LTD., New Taipei (TW)

(72) Inventors: Jen-Sheng Tsai, New Taipei (TW); Tung-Chi Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/389,567

(22) Filed: Jul. 30, 2021

(65) Prior Publication Data

US 2022/0116558 A1   Apr. 14, 2022

(30) Foreign Application Priority Data

Oct. 14, 2020   (CN) .......................... 202011093687.X (51) Int. Cl.
*H04N 5/357*   (2011.01)
*H04N 5/378*   (2011.01)

(52) U.S. Cl.
CPC ........... *H04N 5/3575* (2013.01); *H04N 5/378* (2013.01)

(58) Field of Classification Search
CPC ............................. H04N 5/3575; H04N 5/378
See application file for complete search history.

(56) References Cited

U.S. PATENT DOCUMENTS

| | | | |
|---|---|---|---|
| 2012/0077256 A1* | 3/2012 | Fife | H03K 5/003 |
| | | | 435/286.1 |
| 2014/0117204 A1* | 5/2014 | Ha | H04N 5/3559 |
| | | | 250/208.1 |
| 2015/0021462 A1* | 1/2015 | Ito | H04N 5/35554 |
| | | | 250/208.1 |
| 2015/0049232 A1 | 2/2015 | Kim et al. | |
| 2018/0184023 A1 | 6/2018 | Sato et al. | |
| 2018/0376090 A1 | 12/2018 | Liu | |
| 2021/0266485 A1* | 8/2021 | Kobayashi | H03M 1/0845 |
| 2022/0085813 A1* | 3/2022 | Baker | H03K 19/018571 |

FOREIGN PATENT DOCUMENTS

| | | | |
|---|---|---|---|
| CN | 104378559 A | | 2/2015 |
| JP | 2020526098 A | | 8/2020 |
| JP | 2021034768 A | * | 3/2021 |
| KR | 20200105187 A | * | 10/2019 |
| TW | 201926984 A | | 7/2019 |
| WO | 2017179319 A1 | | 10/2017 |

\* cited by examiner

*Primary Examiner* — Paul M Berardesca
(74) *Attorney, Agent, or Firm* — ScienBiziP, P.C.

(57) ABSTRACT

An image sensor with noise-reduction circuitry includes a pixel array, many analog-to-digital converters, and many correlated dual sampling units. The pixel array includes rows and columns of pixel cells. Each of the pixel cells converts light into analog electrical signal. Analog-to-digital converters convert the electric signals output from the pixel cells into digital signals. The correlated dual sampling units convert the digital signals and/or the electric signals into correlated dual sampling signals to denoise the output of the image sensor by subtraction from the analog content. An electronic device is also provided.

11 Claims, 6 Drawing Sheets

IMAGE SENSOR WITH NOISE CANCELLATION FEATURE AND ELECTRONIC DEVICE WITH SAME

FIELD

The subject matter herein generally relates to imaging and particularly, to an image sensor and an electronic device with same.

BACKGROUND

Intelligent systems increasingly help humans to process complex information of outside world. The information includes sound, light, temperature, pressures, and smells. 80% of information receives by humans is taken in visually. Relying on enormous amount of visual information, advanced image obtaining technology plays an important role in modern intelligent systems.

Image sensor is an important component in an image obtaining device. The image sensor converts an optical image into an electric signal at the light receiving surface by a photoelectric conversion function of a photoelectric device. The electric signal is proportional to the optical image. The image captured ought to be a faithful and accurate representation of a target object, but noise of the image sensor may be from an optional component, a sensor component, and so on. Noise during readout of the image sensor may influence an actual resolution of an image.

SUMMARY

An embodiment of the present application provides an image sensor and an electronic device using same, which can reduce noise.

An embodiment of the present application provides an image sensor. The image sensor includes a pixel array, a number of analog-to-digital converters, and a number of correlated dual sampling units. The pixel array includes a number of rows and a number of columns of pixel cells. Each of the pixel cells is configured to convert light into an electric signal. Each electric signal is an analog signal. The analog-to-digital converters are configured to convert the electric signals output from the pixel cells into digital signals. The correlated dual sampling units are configured to convert the digital signals and/or the electric signals into corresponding correlated dual sampling signals to denoise the signals from the image sensor. When the correlated dual sampling units convert the digital signals, the correlated dual sampling signals are digital signals. When the correlated dual sampling units convert the electric signals, the correlated dual sampling signals are analog signals.

According to some embodiments of the present application, each of the correlated dual sampling units includes a first correlated dual sampling circuit. A first terminal of the first correlated dual sampling circuit is coupled to the pixel array. The first correlated dual sampling circuit is configured to convert the electric signal into a first correlated dual sampling signal. A second terminal of the first correlated dual sampling circuit is coupled to the analog-to-digital converter. The first correlated dual sampling circuit is configured to transfer the first correlated dual sampling signal to the analog-to-digital converter. The analog-to-digital converter converts the first correlated dual sampling signal into the digital signal.

According to some embodiments of the present application, each of the correlated dual sampling units includes a second correlated dual sampling circuit. The second correlated dual sampling circuit is electrically coupled to the analog-to-digital converter. The second correlated dual sampling circuit is configured to convert the digital signal output from the analog-to-digital converter into a second correlated dual sampling signal.

According to some embodiments of the present application, the image sensor further includes a time control circuit and a row driver. The time control circuit is configured to output a time control signal. The row driver is configured to select for output the signals from certain pixel cells in the pixel array.

According to some embodiments of the present application, each of the pixel cells includes a photodiode, a transfer transistor, a driving transistor, a row select transistor, and a reset transistor. A first terminal of the reset transistor is electrically coupled to a power supply terminal, a second terminal of the reset transistor is configured to receive a reset control signal, and a third terminal of the reset transistor is electronically coupled to a floating diffusion node. A first terminal of the transfer transistor is electrically coupled to the floating diffusion node, a second terminal of the transfer transistor is configured to receive a transfer control signal, and a third terminal of the transfer transistor is electrically coupled to a first terminal of the photodiode. A second terminal of the photodiode is grounded. A first terminal of the driving transistor is electrically coupled to the power supply terminal, a second terminal of the driving transistor is configured to receive a sampling of a reset signal, and a third terminal of the driving transistor is electrically coupled to a first terminal of the row select transistor. A second terminal of the row select transistor is configured to receive a sampling of an optoelectronic signal, and a third terminal of the row select transistor is electrically coupled to an output terminal of the pixel cell.

According to some embodiments of the present application, the first correlated dual sampling circuit includes a sampling circuit and a first operational amplifying circuit. The sampling circuit includes a first sampling capacitor and a second sampling capacitor. The first sampling capacitor is configured to sample a reset signal from the pixel array output according to an applied reset control signal. The second sampling capacitor is configured to sample an electric image signal from the pixel array output according to optoelectronic conversion. The first operational amplifying circuit is configured to subtract the sampled reset signal from the sampled electric image signal and accordingly output the first correlated dual sampling signal.

According to some embodiments of the present application, the second correlated dual sampling circuit includes a second operational amplifying circuit. A first input terminal of the second operational amplifier receives the digital signal from the analog-to-digital converter output after conversion by the analog-to-digital converter into the digital signal. A second input terminal of the second operational amplifier receives a digital reset signal from the analog-to-digital converter output after the analog-to-digital converter reset. The second operational amplifier subtracts the digital reset signal from the digital signal.

An embodiment of the present application provides an electronic device. The electronic device includes an image sensor and an image processor. The image sensor includes a pixel array, a plurality of analog-to-digital converters, and a plurality of correlated dual sampling units. The pixel array includes a number of rows and a number of columns of pixel cells. Each of the pixel cells is configured to convert light into an electric signal. Each electric signal is an analog signal. The analog-to-digital converters are configured to convert the electric signals output from the pixel cells into digital signals. The correlated dual sampling units are configured to convert the digital signals and/or the electric signals into correlated dual sampling signals to remove noise generated by the image sensor. When the correlated dual sampling units convert the digital signals, the correlated dual sampling signals are digital signals. When the correlated dual sampling units convert the electric signals, the correlated dual sampling signals are analog signals. The image processor processes the output of signals from the image sensor.

According to some embodiments of the present application, the electronic device further includes an optical system. The optical system is configured to focus incident light at the pixel array.

The image sensor and the electronic device can employ a correlated dual sampling unit to convert the digital signals output from the pixel array and/or the electric signals converted by the analog-to-digital converter into correlated dual sampling signals, thus reducing noise generated by the image sensor.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one." The term "and/or" includes any and all combinations of one or more of the associated listed items.

Figure 1:
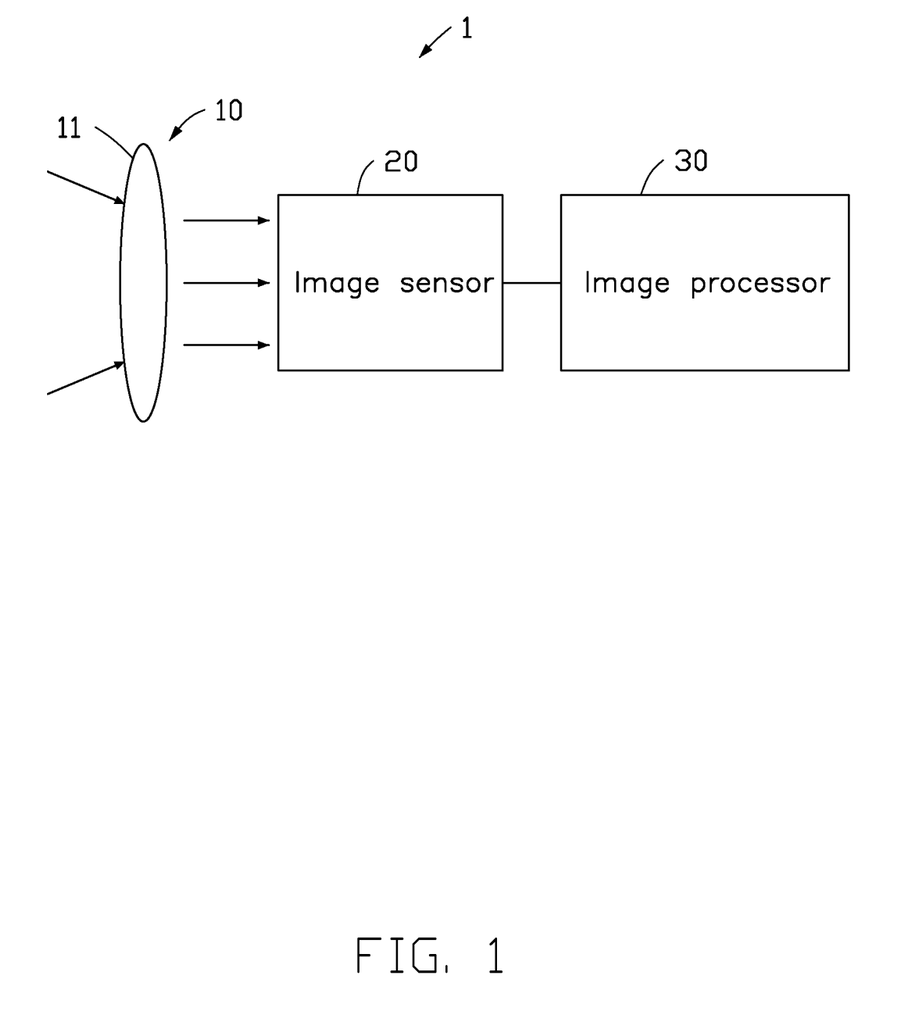
FIG. 1 illustrates a block diagram of an embodiment of an electronic device according to the present disclosure.

FIG. 1 illustrates a block diagram of an electronic device 1 in one embodiment. The electronic device 1 includes an optical system 10, an image sensor 20, and an image processor 30. The electronic device 1 can be a portable imaging system, for example, a camera, a mobile phone, a video camera, or any imaging device capable of digitally capturing images.

An essential component of the optical system 10 is an optical lens 11. The optical lens 11 is formed by a lens system. The lens system may include a number of lenses, for example convex lens and concave lenses. Each convex lens is thicker at the center than at the periphery, but vice versa for the concave lens. Thus, light rays are more refracted at the periphery of the lens than at the center of the lens. The light rays of object can pass through the lens and form a sharp image at the focal plane via a refraction principle of the lens. In at least one embodiment, the optical system 10 further includes an infrared filter. The infrared filter blocks near-infrared wavelengths while passing visible light into the optical lens 11, thus the image is clearer to the human eye.

The image sensor 20 is configured to convert the light passing through the optical lens 11 into an electric signal and output a digital signal after processing the electric signal. In detail, after light from target object is refracted by the lens of the optical system 10, a focus is formed at an imaging surface of a camera tube or a solid-state imaging element of the image sensor 20. A photodiode GX of the image sensor 20 converts an optical image outside the focus to an electric signal. The image sensor 20 outputs the digital signal to the image processor 30 after processing the electric signal.

The image processor 30 is configured to process the digital signal output from the image sensor 20 and output the same in RGB format, YUV format, or the like. The processing by the image processor 30 may influence image quality, for example, color saturation, definition, fluency, and so on.

Figure 2:
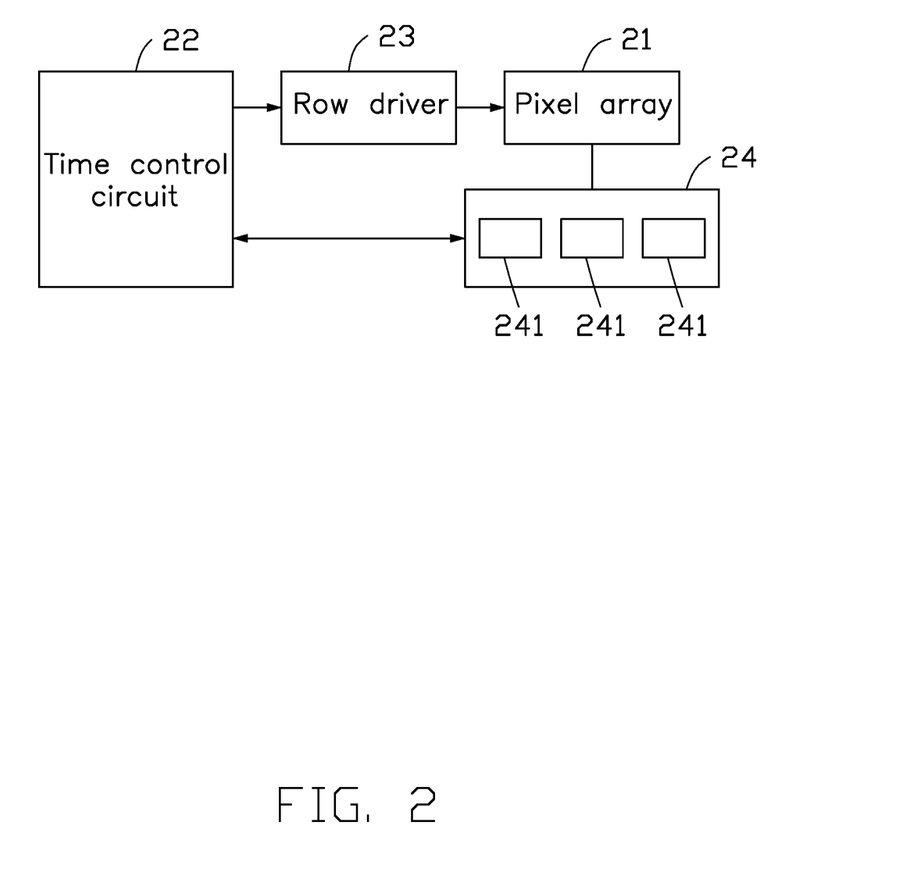
FIG. 2 illustrates a block diagram of an embodiment of an image sensor of the electronic device of FIG. 1.
Figure 3:
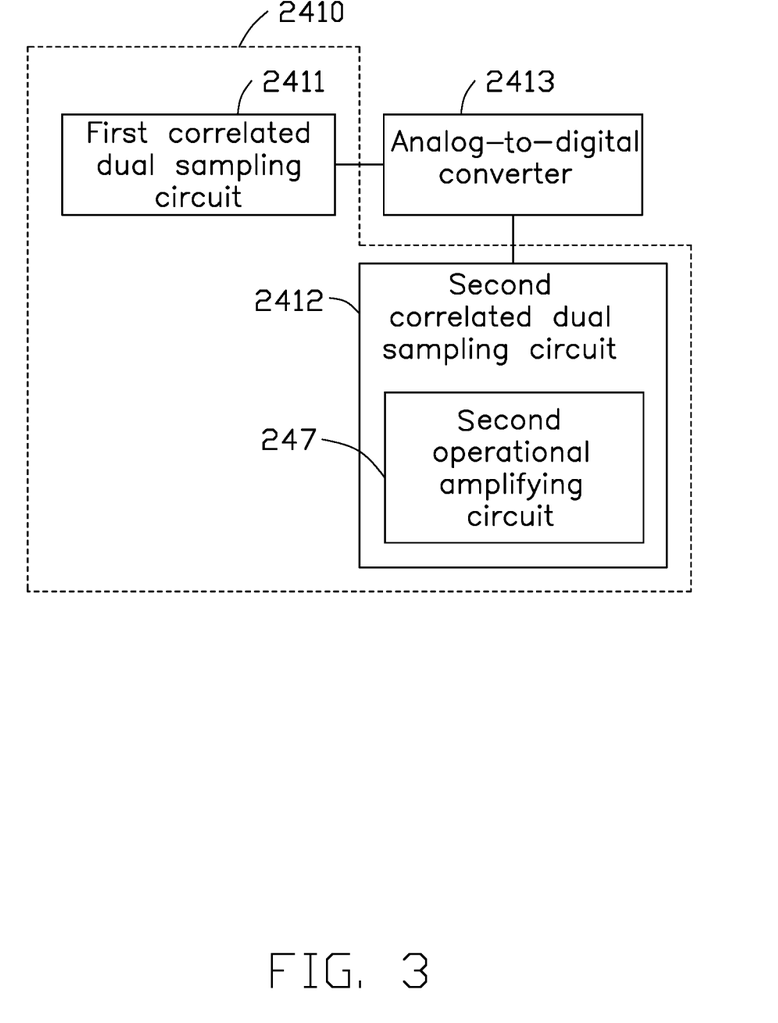
FIG. 3 illustrates a block diagram of an embodiment of a conversion unit of the electronic device of FIG. 1.

FIG. 2 illustrates a block diagram of an embodiment of an image sensor 20 of the electronic device 1. The image sensor 20 includes a pixel array 21, a time control circuit 22, a number of row drivers 23, and a conversion module 24. Referring also to FIG. 3, the conversion module 24 includes a number of conversion units 241. Each conversion unit 241 includes a correlated dual sampling unit 2410 and an analog-to-digital converter 2413. The correlated dual sampling unit 2410 includes a first correlated dual sampling circuit 2411 and a second correlated dual sampling circuit 2412.

In the embodiment, the time control circuit 22 is configured to control operating characteristics of the pixel array 21 and generate a time control signal. The time control circuit 22 generates control logic signals to control transistors of the pixel cells of the pixel array 21, for example, control an accumulation of the charges of the photodiode GX, a transfer of the charges of the photodiode GX, and a reset of the charges of the photodiode GX. Further, the time control circuit 22 determines a logic level of each control logic signal to adjust a value of the driving voltage applied on the row line by the row driver 23.

In the embodiment, the image sensor 20 may include a number of row drivers 23. Each row driver 23 selects a row of the pixel array 21 or a column of the pixel array 21 to generate a raw time-controlled signal for processing. Each row driver 23 is arranged in one or more rows to provide driving voltages to driving transistors in the pixel cells of the corresponding rows. For example, the row driver 23 provides a driving voltage RST to reset transistors in the first row, and provides a driving voltage TX1 to transfer transistors in the first row.

The pixel array 21 is a two-dimensional image sensing pixel array, for example, a matrix of m rows and n columns of pixel cells. M and n are respectively positive integer numbers. The pixel cells may be the same. Each pixel cells includes an optical sensor, for example, a photodiode GX. The optical sensor receives incident light and converts the photons to electrical charges.

In the embodiment, the photodiode GX included in the pixel array 21 is configured to detect light intensity by optoelectronic conversion. The photodiode GX is an optical detector capable of converting light into an electrical current or voltage according to modes of use. The photodiode GX uses a p-n junction having photosensitive characteristics. The photodiode GX is sensitive to change of the light and has unidirectional conductivity. The electrical characteristics of the photodiode GX can vary with different light intensities. Thus, light intensity actually varies the electric current in the circuit.

In the embodiment, the pixel array 21 further includes an electro-optic transducer, for example a transistor. In the embodiment, the transistor can be a row select switch. The transistor is configured to output an electric image signal A(S) according to the optoelectronic conversion of the photodiode GX and output a reset signal A(R) according to the applied reset voltage. The electric image signal A(S) and the reset signal A(R) are analog signals.

Figure 4:
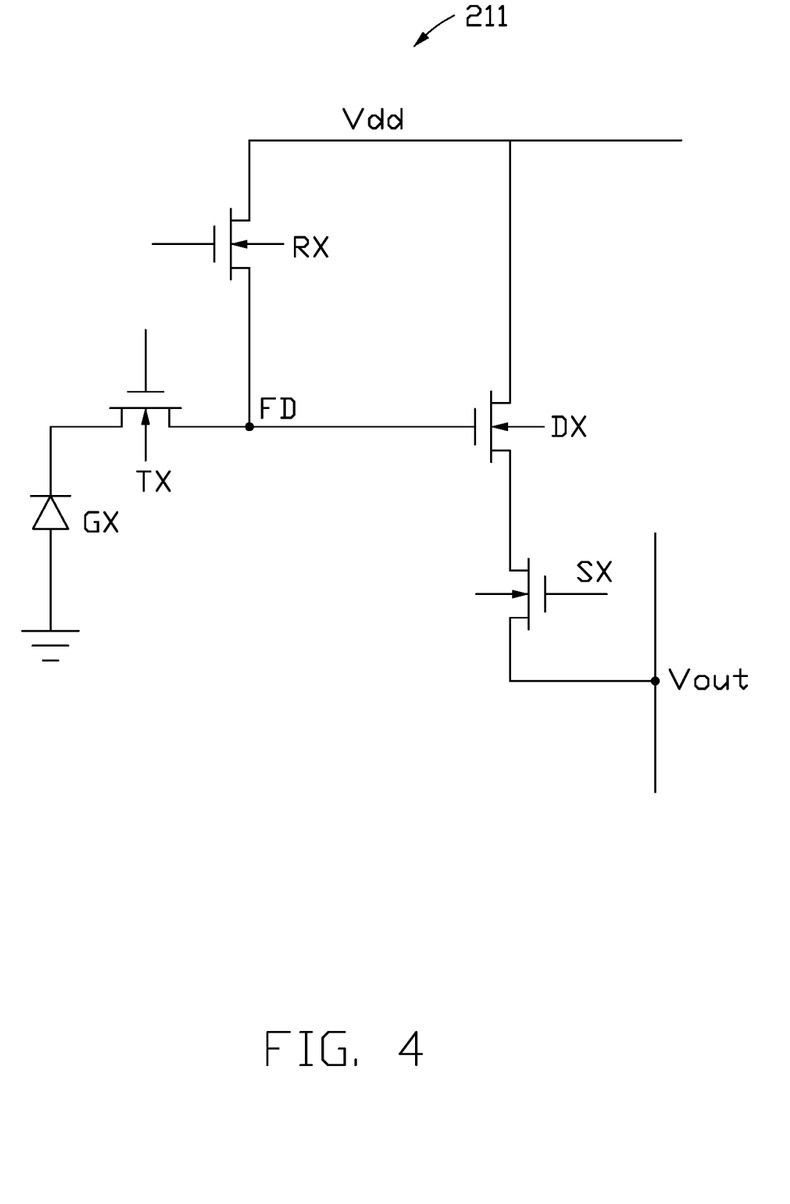
FIG. 4 illustrates a pixel cell of a pixel array of the image sensor of FIG. 2.

In at least one embodiment, the pixel array 21 can include a number of pixel cells 211. Each pixel cell 211 may include a photodiode GX, a transfer transistor TX, a driving transistor DX, a row select transistor SX, and a reset transistor RX. The photodiode GX captures incident light and converts the incident light into charges. The charges are selectively transferred from the photodiode GX to floating diffusion via the transfer transistor TX. The transfer transistor TX is controlled by the transfer gate (TG) signal. The floating diffusion is coupled to a gate of the driving transistor DX. The driving transistor DX serves as a source follower coupled transistor (amplifier) to buffer an output voltage. The output voltage is selectively transferred as the output voltage OUT by the row select transistor SX. The row select transistor SX is controlled by a row select signal SEL applied to a gate of the row select transistor SX. The reset transistor RX is controlled by the reset signal RS to selectively reset the accumulated charges in the floating diffusion to a reference voltage.

In detail, as shown in FIG. 4, the pixel cell 211 includes the photodiode GX, the transfer transistor TX, the driving transistor DX, the row select transistor SX, and the reset transistor RX, a floating diffusion node FD, an output terminal Vout, and a power supply terminal Vdd. The voltage of the floating diffusion node FD is proportional to the voltage of the output terminal Vout. RST is a reset control signal of the reset transistor RX. TX1 is a transfer control signal of the transfer transistor TX. SHR is a sampling of the reset signal. SHS is a sampling of the optoelectronic signal.

A first terminal of the reset transistor RX is electronically coupled to the power supply terminal Vdd. A second terminal of the reset transistor RX is configured to receive the reset control signal RST. A third terminal of the reset transistor RX is electronically coupled to the floating diffusion node FD. A first terminal of the transfer transistor TX is electrically coupled to the floating diffusion node FD. A second terminal of the transfer transistor TX is configured to receive a transfer control signal TX1. A third terminal of the transfer transistor TX is electrically coupled to a first terminal of the photodiode GX. A second terminal of the photodiode GX is grounded. A first terminal of the driving transistor DX is electrically coupled to the power supply terminal Vdd. A second terminal of the driving transistor DX is configured to receive the sampling of the reset signal SHR. A third terminal of the driving transistor DX is electrically coupled to a first terminal of the row select transistor SX. A second terminal of the row select transistor SX is configured to receive the sampling of the optoelectronic signal SHS. A third terminal of the row select transistor SX is electrically coupled to the output terminal Vout.

When the RST is a high level, the reset transistor RX is made conductive. The reset transistor RX outputs the reset signal to the floating diffusion node FD and the output terminal Vout. When the SHR is a high level, the conversion module 24 samples the reset signal A(R) of the floating diffusion node FD or the output terminal Vout to obtain a value of a reset signal VA(R). When the TX1 is a high level, the transfer transistor TX is made conductive. The transfer transistor TX outputs the sampling of the optoelectronic signal SHS of the photodiode GX to the floating diffusion node FD and the output terminal Vout. When the SHS is a high level, the conversion module 24 samples the sampling of the optoelectronic signal SHS of the floating diffusion node FD or the output terminal Vout, namely the electric image signal A(S), to obtain a value of the electric image signal VA(S).

In the embodiment, each conversion unit 241 is coupled to a row of the pixel cells 211 or a column of the pixel cells 211 of the pixel array 21. For example, each conversion unit 241 is coupled via conductive metal connector.

The first correlated dual sampling circuit 2411 is configured to generate a first CDS signal according to the signal output from the pixel array 21. The first CDS signal is an analog signal. The first correlated dual sampling circuit 2411 transfers the first CDS signal to the analog-to-digital converter 2413. The analog-to-digital converter 2413 converts the first CDS signal into a digital signal. The second correlated dual sampling circuit 2412 receives the digital signal output from the analog-to-digital converter 2413 and outputs a second CDS signal according to the digital signal. The second CDS signal is a digital signal.

In the embodiment, the first correlated dual sampling circuit 2411 is configured to correct the electric image signal by using the reset signal to obtain an actual image signal, namely the first CDS signal. Output waveform of each pixel cell 211 may be the image signal at a point in time, and is reset level and interference at the reset of time. The first correlated dual sampling circuit 2411 extracts the image signal and removes noise. After the signals of each pixel cell 211 are sampled, at least one capacitor keeps the signals until sampling of the next signals of the pixel cells 211. In detail, the first correlated dual sampling circuit 2411 subtracts the value of the reset signal VA (R) from the value of the electric image signal VA(S) to obtain a value of the actual image signal VA(R-S). The analog-to-digital converter 2413 converts the actual image signal A(R-S) into a digital signal, and outputs the digital signal D(R-S).

Figure 5:
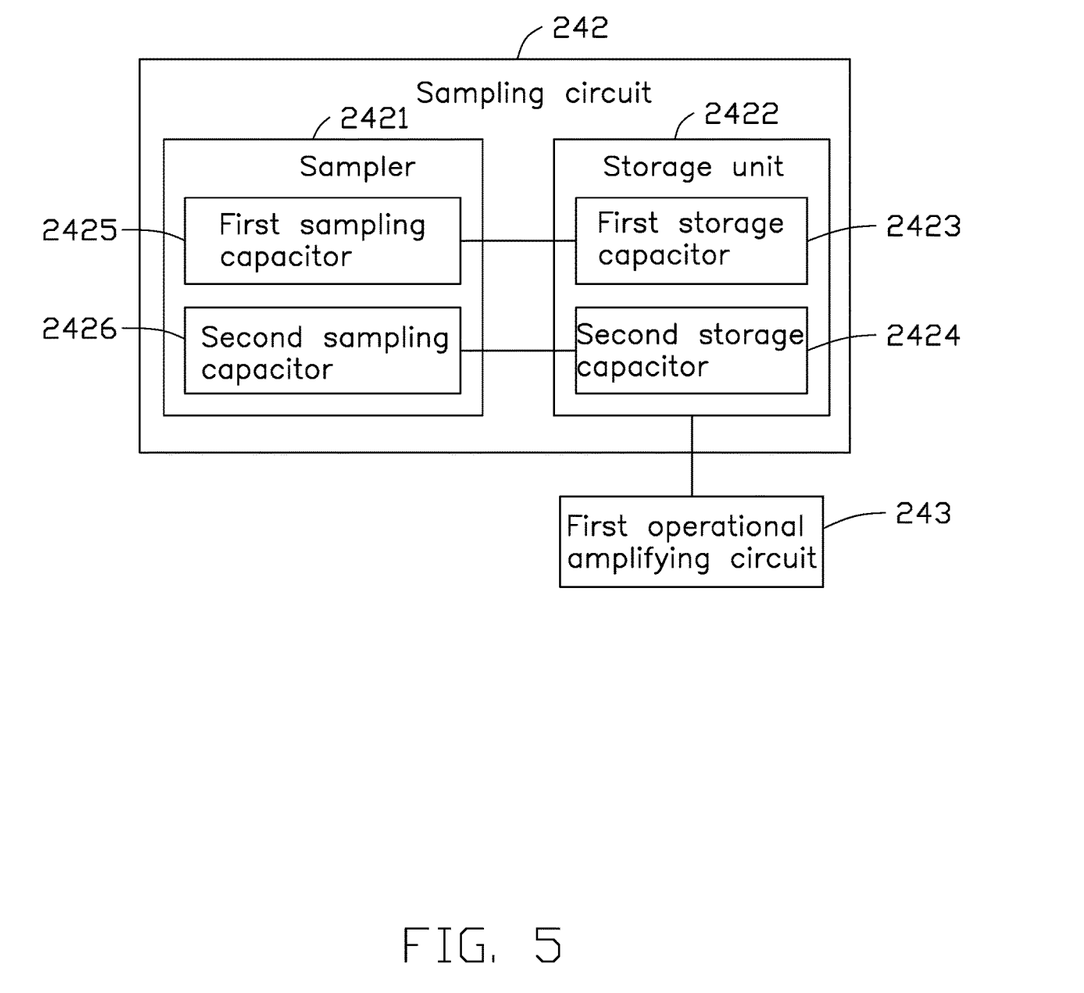
FIG. 5 illustrates a block diagram of an embodiment of a first correlated dual sampling circuit of the conversion unit of FIG. 3.

In the embodiment, referring also to FIG. 5, the first correlated dual sampling circuit 2411 includes a sampling circuit 242 and a first operational amplifying circuit 243. The sampling circuit 242 includes a sampler 2421 and a storage unit 2422. In the embodiment, the storage unit 2422 includes a first storage capacitor 2423 and a second storage capacitor 2424, the sampler 2421 includes a first sampling capacitor 2425 and a second sampling capacitor 2426. The first sampling capacitor 2425 samples the reset signal A(R) output from the pixel array 21 to obtain a value of the reset signal VA (R) according to a preset CDS sequence. The second sampling capacitor 2426 samples the electric image signal A(S) output from the pixel array 21 to obtain the value of the electric image signal VA(S) according to the preset CDS sequence. The first storage capacitor 2423 stores the value of the reset signal VA (R). The second storage capacitor 2424 stores the value of the electric image signal VA(S).

In the embodiment, the first operational amplifying circuit 243 can be a first operational amplifier. Two input terminals of the first operational amplifier are respectively coupled to the first storage capacitor 2423 and the second storage capacitor 2424. The first operational amplifier subtracts the value of the reset signal VA (R) from the value of the electric image signal VA(S) to obtain a differential analog signal, namely the value of the actual image signal VA(R-S).

In the embodiment, the analog-to-digital converter 2413 converts the value of the actual image signal VA(R-S) into a digital signal VD(R-S). The analog-to-digital converter 2413 is an electric component capable of converting the analog signal into the digital signal. A common analog-to-digital converter 2413 converts an input signal into an output digital signal. The digital signal itself has no practical size or power, it only represents a relative size. Any analog-to-digital converter 2413 needs a reference analog quantity as a standard for making a conversion. A common reference standard is a largest value of the signal capable of converting. The output digital quantity represents size of the output converting signal relative to the reference signal.

Figure 6:
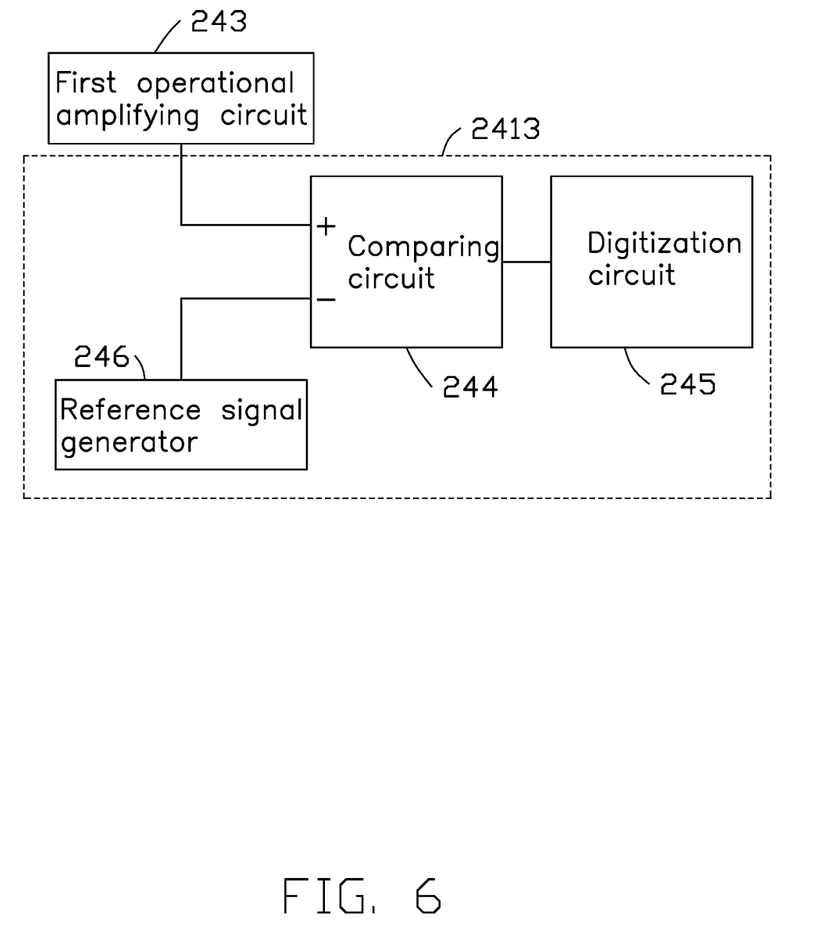
FIG. 6 illustrates a block diagram of an embodiment of an analog-to-digital converter of the electronic device of FIG. 1.

In the embodiment, referring also to FIG. 6, the analog-to-digital converter 2413 includes a comparing circuit 244, a digitization circuit 245, and a reference signal generator 246. The reference signal generator 246 is configured to generate the reference signal. The reference signal can be a ramp signal or a DC reference signal.

In detail, the comparing circuit 244 includes a comparator. A positive terminal of the comparator receives the value of the actual image signal VA(R-S) being output from the first operational amplifier. A negative terminal of the comparator receives the reference signal output from the reference signal generator 246. The comparator compares the value of the actual image signal VA(R-S) and the reference signal, and outputs a comparison. The digitization circuit 245 digitizes the comparison and outputs the digital signal VD(R-S).

In the embodiment, the second correlated dual sampling circuit 2412 is configured to remove noise from the analog-to-digital converter 2413. Thus the second correlated dual sampling circuit 2412 can remove noise of the analog-to-digital converter 2413 itself.

In detail, referring again to FIG. 3, the second correlated dual sampling circuit 2412 includes a second operational amplifying circuit 247. The second operational amplifying circuit 247 can be a second operational amplifier. Two input terminals of the second operational amplifier each receive the digital signal VD(R-S) output from the analog-to-digital converter 2413 and a digital reset signal DR of the analog-to-digital converter 2413. The second operational amplifier subtracts the digital reset signal DR from the digital signal VD(R-S) to obtain the actual image signal which now has a reduced level of noise.

In at least one embodiment, only one correlated dual sampling circuit is employed. After the pixel array 21 outputs the electric signal to the analog-to-digital converter 2413, the analog-to-digital converter 2413 directly converts the output electric signal into a digital signal. The analog-to-digital converter 2413 does not remove noise before analog-digital conversion by the correlated dual sampling circuit. The analog-to-digital converter 2413 is coupled to the correlated dual sampling circuit. The analog-to-digital converter 2413 removes noise from the digital signal only after analog-digital conversion, thus noise of the pixel array 21 and of the analog-to-digital converter 2413 can be removed.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An image sensor comprising:
    a pixel array comprising a plurality of rows and a plurality of columns of pixel cells, each of the pixel cells being configured to convert light into an electric signal, each of the electric signal being an analog signal;
    a plurality of analog-to-digital converters configured to convert the electric signals output from the pixel cells into digital signals; and
    a plurality of correlated dual sampling units configured to convert the digital signals and/or the electric signals into correlated dual sampling signals to remove noise of the image sensor;
    wherein when the correlated dual sampling units convert the digital signals, the correlated dual sampling signals outputted by the correlated dual sampling units are digital signals, and when the correlated dual sampling units convert the electric signals, the correlated dual sampling signals outputted by the correlated dual sampling units are analog signals;
    wherein each of the correlated dual sampling units comprises a second correlated dual sampling circuit;
    the second correlated dual sampling circuit is electrically coupled to the analog-to-digital converter, the second correlated dual sampling circuit is configured to convert the digital signal output from the analog-to-digital converter into a second correlated dual sampling signal;
    the second correlated dual sampling circuit comprises a second operational amplifying circuit;
    a first input terminal of the second operational amplifier receives the digital signal from the analog-to-digital converter output after conversion by the analog-to-digital converter into the digital signal, and a second input terminal of the second operational amplifier receives a digital reset signal from the analog-to-digital converter output after the analog-to-digital converter being reset;
    the second operational amplifier subtracts the digital reset signal from the digital signal.

2. The image sensor according to claim 1, wherein:
    each of the correlated dual sampling units comprises a first correlated dual sampling circuit;

a first terminal of the first correlated dual sampling circuit is coupled to the pixel array, the first correlated dual sampling circuit is configured to convert the electric signal into a first correlated dual sampling signal;

a second terminal of the first correlated dual sampling circuit is coupled to the analog-to-digital converter, the first correlated dual sampling circuit is configured to transfer the first correlated dual sampling signal to the analog-to-digital converter, the analog-to-digital converter converts the first correlated dual sampling signal into the digital signal.

3. The image sensor according to claim 1, wherein the image sensor further comprises a time control circuit and a plurality of row drivers;

the time control circuit is configured to output a time control signal;

the row drivers are configured to select for output the signals from certain pixel cells in the pixel array.

4. The image sensor according to claim 2, wherein each of the pixel cells comprises a photodiode, a transfer transistor, a driving transistor, a row select transistor, and a reset transistor;

a first terminal of the reset transistor is electrically coupled to a power supply terminal, a second terminal of the reset transistor is configured to receive a reset control signal, and a third terminal of the reset transistor is electronically coupled to a floating diffusion node;

a first terminal of the transfer transistor is electrically coupled to the floating diffusion node, a second terminal of the transfer transistor is configured to receive a transfer control signal, and a third terminal of the transfer transistor is electrically coupled to a first terminal of the photodiode;

a second terminal of the photodiode is grounded;

a first terminal of the driving transistor is electrically coupled to the power supply terminal, a second terminal of the driving transistor is configured to receive a sampling of a reset signal, and a third terminal of the driving transistor is electrically coupled to a first terminal of the row select transistor;

a second terminal of the row select transistor is configured to receive a sampling of an optoelectronic signal, and a third terminal of the row select transistor is electrically coupled to an output terminal of the pixel cell.

5. The image sensor according to claim 2, wherein:

the first correlated dual sampling circuit comprises a sampling circuit and a first operational amplifying circuit;

the sampling circuit comprises a first sampling capacitor and a second sampling capacitor;

the first sampling capacitor is configured to sample a reset signal from the pixel array output according to an applied reset control signal;

the second sampling capacitor is configured to sample an electric image signal from the pixel array output according to optoelectronic conversion;

the first operational amplifying circuit is configured to subtract the sampled reset signal from the sampled electric image signal and accordingly output the first correlated dual sampling signal.

6. An electronic device comprising:

an image processor; and an image sensor, the image sensor comprising:

a pixel array comprising a plurality of rows and a plurality of columns of pixel cells, each of the pixel cells being configured to convert light into an electric signal, the electric signal being an analog signal;

a plurality of analog-to-digital converters configured to convert the electric signals output from the pixel cells into digital signals; and a plurality of correlated dual sampling units configured to convert the digital signals and/or the electric signals into correlated dual sampling signals to remove noise of the image sensor;

wherein when the correlated dual sampling units converting the digital signals, the correlated dual sampling signals being digital signals, and when the correlated dual sampling units converting the electric signals, the correlated dual sampling signals being analog signals;

wherein the image processor processes the output of signals from the image sensors;

wherein each of the correlated dual sampling units comprises a second correlated dual sampling circuit;

the second correlated dual sampling circuit is electrically coupled to the analog-to-digital converter, the second correlated dual sampling circuit is configured to convert the digital signal output from the analog-to-digital converter into a second correlated dual sampling signal;

the second correlated dual sampling circuit comprises a second operational amplifying circuit;

a first input terminal of the second operational amplifier receives the digital signal from the analog-to-digital converter output after conversion by the analog-to-digital converter into the digital signal, and a second input terminal of the second operational amplifier receives a digital reset signal from the analog-to-digital converter output after the analog-to-digital converter being reset;

the second operational amplifier subtracts the digital reset signal from the digital signal.

7. The electronic device according to claim 6, wherein:

each of the correlated dual sampling units comprises a first correlated dual sampling circuit;

a first terminal of the first correlated dual sampling circuit is coupled to the pixel array, the first correlated dual sampling circuit is configured to convert the electric signal into a first correlated dual sampling signal;

a second terminal of the first correlated dual sampling circuit is coupled to the analog-to-digital converter, the first correlated dual sampling circuit is configured to transfer the first correlated dual sampling signal to the analog-to-digital converter, the analog-to-digital converter converts the first correlated dual sampling signal into the digital signal.

8. The electronic device according to claim 6, wherein the image sensor further comprises a time control circuit and a plurality of row drivers;

the time control circuit is configured to output a time control signal;

the row drivers are configured to select for output the signals from certain pixel cells in the pixel array.

9. The electronic device according to claim 7, wherein each of the pixel cells comprises a photodiode, a transfer transistor, a driving transistor, a row select transistor, and a reset transistor;

a first terminal of the reset transistor is electrically coupled to a power supply terminal, a second terminal of the reset transistor is configured to receive a reset control signal, and a third terminal of the reset transistor is electronically coupled to a floating diffusion node;

a first terminal of the transfer transistor is electrically coupled to the floating diffusion node, a second terminal of the transfer transistor is configured to receive a transfer control signal, and a third terminal of the transfer transistor is electrically coupled to a first terminal of the photodiode;

a second terminal of the photodiode is grounded;

a first terminal of the driving transistor is electrically coupled to the power supply terminal, a second terminal of the driving transistor is configured to receive a sampling of a reset signal, and a third terminal of the driving transistor is electrically coupled to a first terminal of the row select transistor;

a second terminal of the row select transistor is configured to receive a sampling of an optoelectronic signal, and a third terminal of the row select transistor is electrically coupled to an output terminal of the pixel cell.

10. The electronic device according to claim 7, wherein:

the first correlated dual sampling circuit comprises a sampling circuit and a first operational amplifying circuit;

the sampling circuit comprises a first sampling capacitor and a second sampling capacitor;

the first sampling capacitor is configured to sample a reset signal from the pixel array output according to an applied reset control signal;

the second sampling capacitor is configured to sample an electric image signal from the pixel array output according to optoelectronic conversion;

the first operational amplifying circuit is configured to subtract the sampled reset signal from the sampled electric image signal and accordingly output the first correlated dual sampling signal.

11. The electronic device according to claim 6, wherein:

the electronic device further comprises an optical system;

the optical system is configured to focus incident light at the pixel array.

* * * * *